(12) United States Patent
Eghbal

(10) Patent No.: US 11,729,008 B2
(45) Date of Patent: Aug. 15, 2023

(54) POWER OVER ETHERNET PORT MULTIPLEXER SYSTEM, APPARATUS, AND METHOD

(71) Applicant: Ali Eghbal, San Diego, CA (US)

(72) Inventor: Ali Eghbal, San Diego, CA (US)

( * ) Notice: Subject to any disclaimer, the term of this patent is extended or adjusted under 35 U.S.C. 154(b) by 0 days.

(21) Appl. No.: 17/200,389

(22) Filed: Mar. 12, 2021

(65) Prior Publication Data

US 2022/0294654 A1    Sep. 15, 2022

(51) Int. Cl.
*H04L 12/10* (2006.01)
*G06F 1/26* (2006.01)
*H04L 12/40* (2006.01)

(52) U.S. Cl.
CPC .............. *H04L 12/10* (2013.01); *G06F 1/266* (2013.01); *H04L 12/40045* (2013.01)

(58) Field of Classification Search
CPC .... H04L 12/10; H04L 12/40045; G06F 1/266
See application file for complete search history.

(56) References Cited

U.S. PATENT DOCUMENTS

| 2006/0112288 | A1* | 5/2006 | Schindler | G06F 1/266 |
| | | | | 713/300 |
| 2007/0284941 | A1* | 12/2007 | Robbins | H04L 12/10 |
| | | | | 307/2 |
| 2008/0168283 | A1* | 7/2008 | Penning | H04L 12/10 |
| | | | | 713/310 |
| 2010/0023784 | A1* | 1/2010 | Schindler | G06F 1/3203 |
| | | | | 713/300 |
| 2013/0049469 | A1* | 2/2013 | Huff | G06F 1/266 |
| | | | | 307/62 |

* cited by examiner

*Primary Examiner* — Jaweed A Abbaszadeh
*Assistant Examiner* — Brian J Corcoran
(74) *Attorney, Agent, or Firm* — Merle W. Richman, III

(57) ABSTRACT

A system, topology, and methods for multiplexing a plurality of POE ports at a POE switch via a single standard wired connection to the downstream where the multiplexed signals and power may be demultiplexed to a plurality of ports.

20 Claims, 14 Drawing Sheets

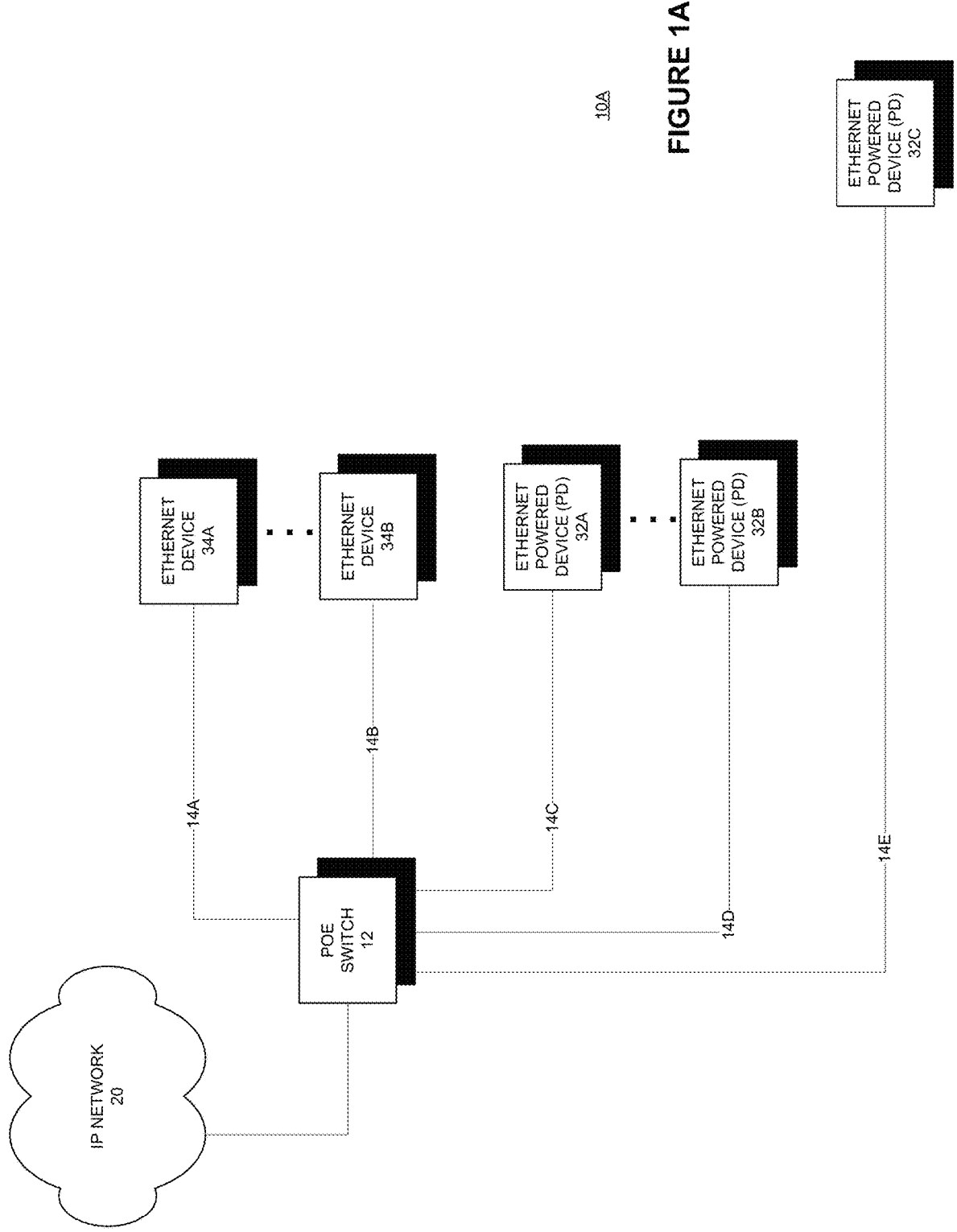

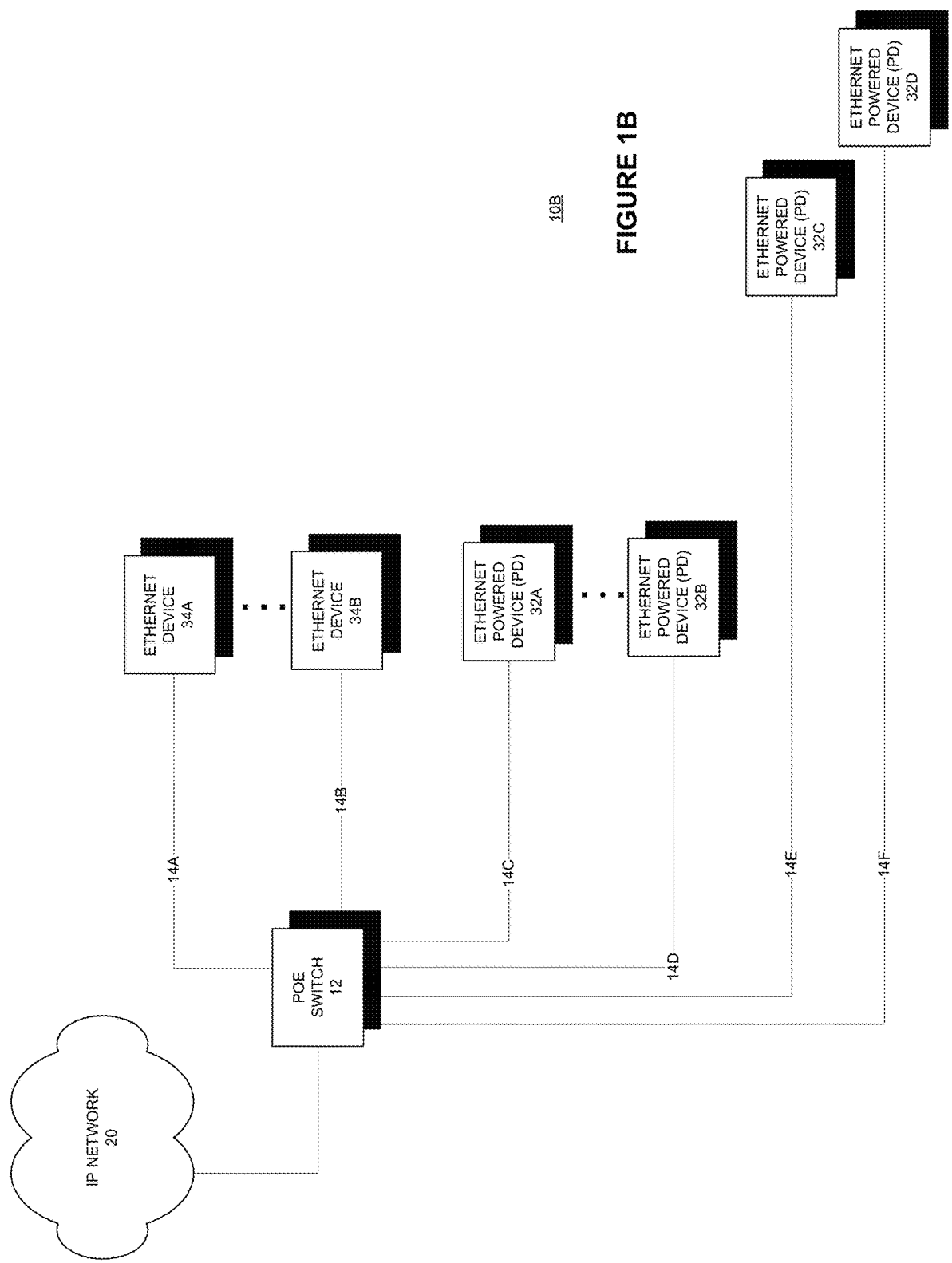

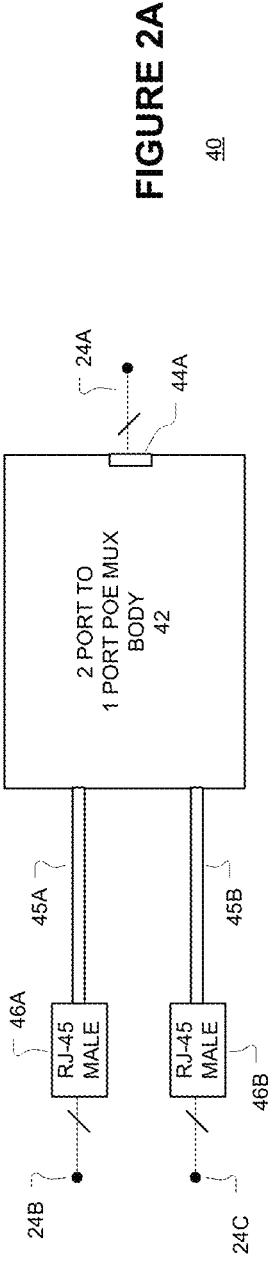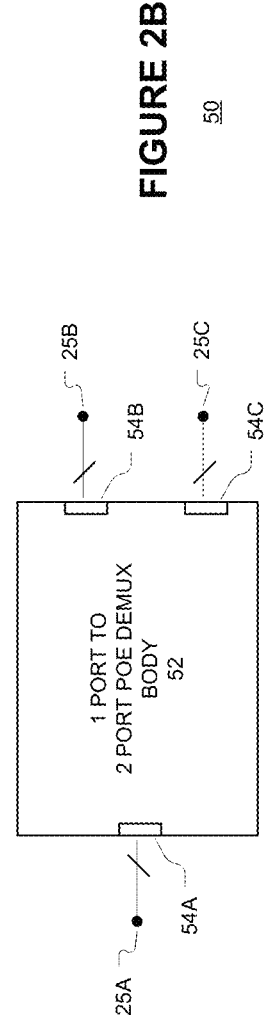

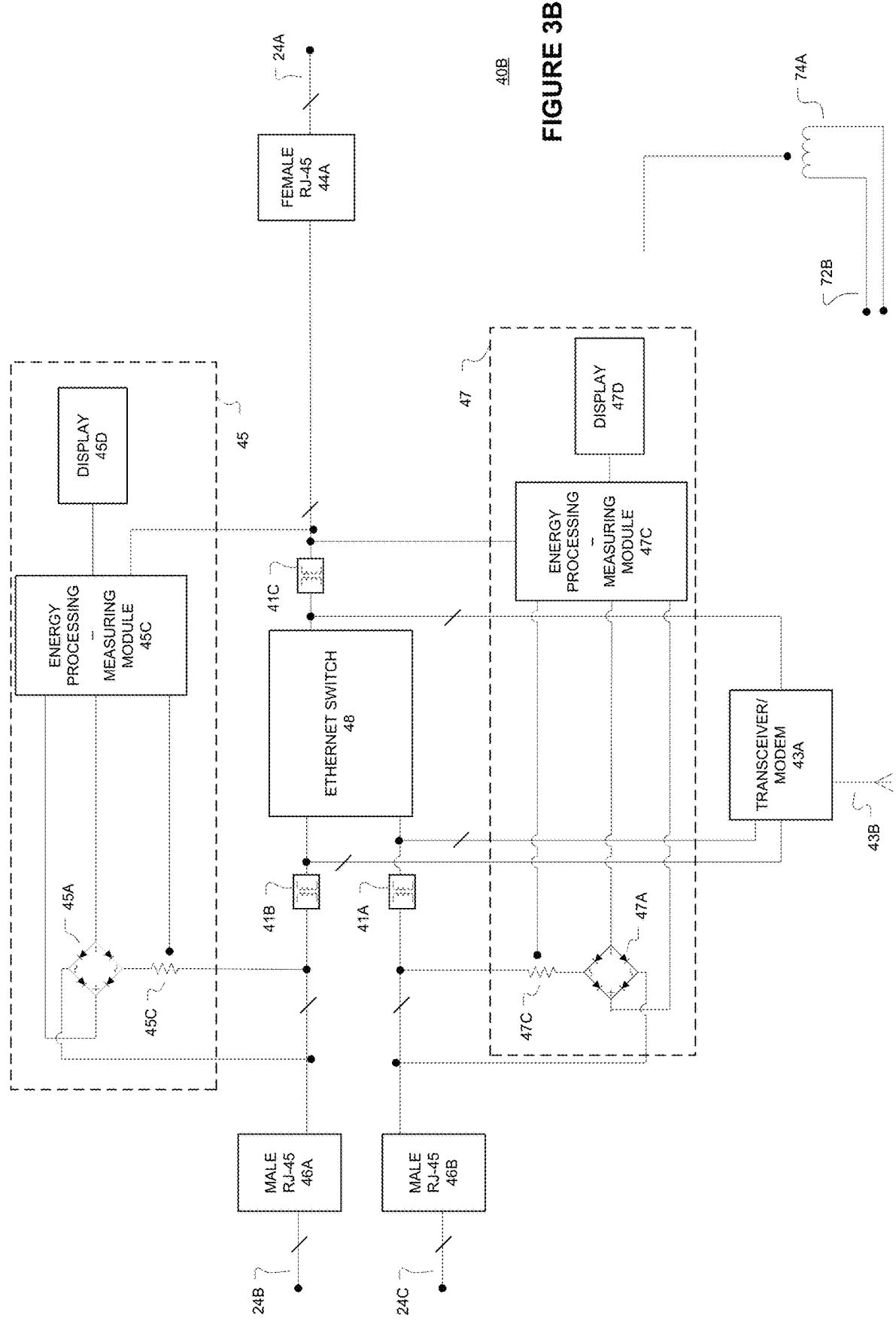

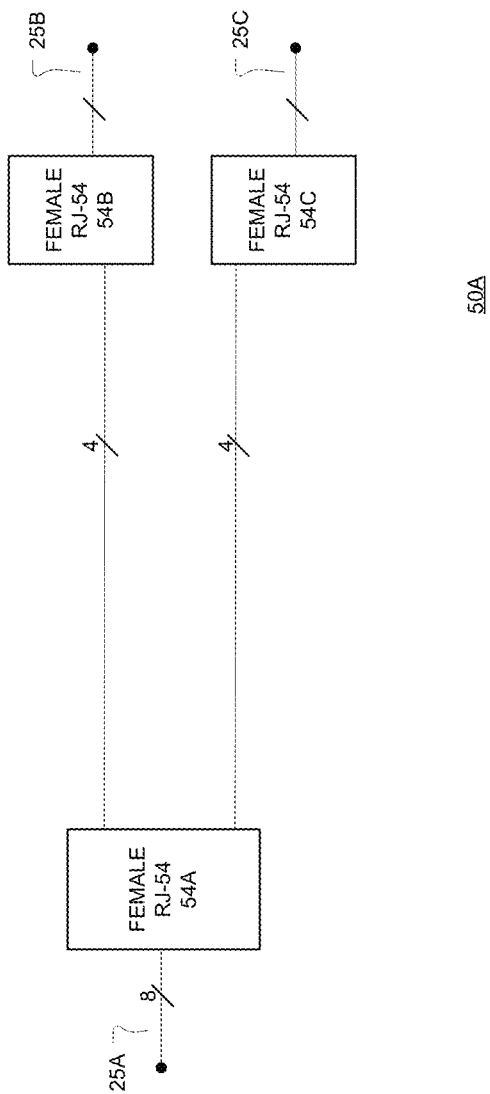

POWER OVER ETHERNET PORT MULTIPLEXER SYSTEM, APPARATUS, AND METHOD

TECHNICAL FIELD

Various embodiments described herein relate to reducing cabling needed to add a new POE device to an existing POE network.

BACKGROUND INFORMATION

It may be desirable to reduce the cabling needed to add a new POE device to an existing POE network.

BRIEF DESCRIPTION OF THE DRAWINGS

FIG. 1A is a simplified diagram of Power Over Ethernet ("POE") architecture according to various embodiments.

FIG. 1B is a simplified diagram Power Over Ethernet ("POE") architecture shown in FIG. 1B with a new POE device according to various embodiments.

FIG. 2A is a simplified diagram of a POE multiplexer according to various embodiments.

FIG. 2B is a simplified diagram of a POE demultiplexer according to various embodiments.

FIGS. 3A and 3B are block diagrams of POE multiplexers according to various embodiments.

FIGS. 3C and 3D are block diagrams of POE demultiplexers according to various embodiments.

DETAILED DESCRIPTION

Figure 1C:
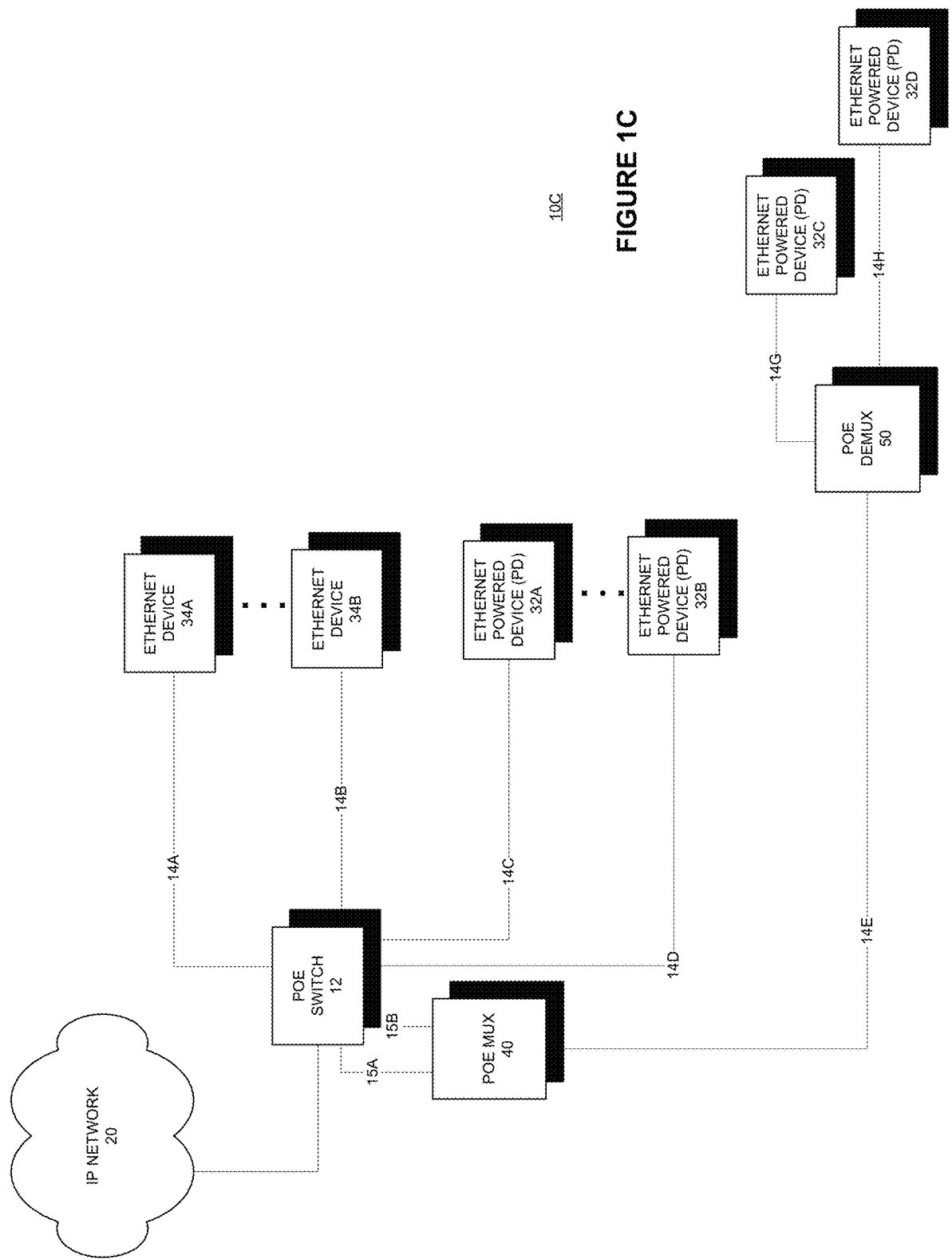
FIG. 1C is a simplified diagram Power Over Ethernet ("POE") architecture shown in FIG. 1A with a POE device according to various embodiments.

FIG. 1A is a simplified diagram of POE architecture 10A according to various embodiments. As shown in FIG. 1A, architecture 10 may include an internet protocol (IP) network 20, a POE router or switch (switch) 12 may be coupled to a plurality of Ethernet devices 34A-B at various locations via wires 14A-B and a plurality POE devices (PD) 32A-C at various locations via wires 14C-E. In an embodiment, an internet switch with a separate POE power source may be employed. The IP network 20 may communicate data using an internet protocol with devices coupled to the network 20. The IP network 20 may be a network of networks including the global Internet. The switch 12 may enable communication between devices 32A-B, 34A-C and the IP network 20 and with each other at various locations via cables 14A-B. The switch 12 may also provide power to one or more devices 32A-C at various locations via cables 14C-E. The cables 14A-E may be standardized Ethernet cables, commonly including 4 pairs of wires. Standardized Ethernet cables may have a rating based on the Institute of Electrical and Electronics Engineers (IEEE) standards such as a category 3, 5, 5e, 6, and 6a cables (wires). Standard or common Ethernet cabling may enable data to be communicated differentially over four pairs, in particular wires 1-2, 3-6, 4-5, and 7-8.

Devices 34A-B and 32A-C commonly require power to operate. In order to reduce infrastructure and wiring costs operational power may also be provided over a standard ethernet cable, termed power over ethernet (POE). Devices 32A-C receiving power over ethernet may be termed a powered device (PD). Power over Ethernet may be provided via standard Ethernet cabling according to one or more IEEE standards including 802.3af (PoE standard), 802.3at (PoE+ or PoE plus), IEEE 802.3bu, and IEEE 802.3bt (4PPoE). The 802.3af standard may enable the transmission of power up to 15.4 W (minimum 44V DC and 350 mA). The 802.3at standard may enable the transmission of power up to 25.5 W. The IEEE 802.3bu standard may enable the transmission of power up to 50 W (at PD). The IEEE 802.3bt standard may enable the transmission of power up to up to 55 W (Type 3) and up to 90-100 W (Type 4).

In an embodiment, POE switch 12 may provide power to Ethernet PD 32A-C. The power may be sufficient to enable Ethernet PD 32A-C to operate without access to another power source. A PD 32A, 32B may include IP telephones, wireless LAN access points, cameras with pan tilt and zoom (PTZ), remote Ethernet switches, embedded computers, thin clients and LCDs. In an embodiment, POE source equipment (PSE) may also be co-located in a switch, router, or other network communication device 12. In an embodiment, a POE switch 12 may provide power to PD 32A-C and may not communicate data or be coupled to an IP network 20. A PD 32A-B may be compliant with one or more standards 802.3af (PoE standard), 802.3at (PoE+ or PoE plus), IEEE 802.3bu, and IEEE 802.3bt (4PPoE). A POE switch 12 may provide different power levels to a PD 32A-C according to a standard. For example, a POE switch 12 may sense that a coupled device 32A-C is a POE device (PD) and is complaint with a particular standard. Then the POE switch 12 may provide different levels of energy to a PD via various wires of an Ethernet cable 14C-E.

As noted, devices 34A-B and 32A-C may be placed at different locations in architecture 10A. The distance between a POE switch 12 and PD 32A-C may be limited based on the voltage levels being supplied to the PD 32A-C and cable type (category 3 or 5), but is typically limited to 100 meters. When a new device such as PD 32D in FIG. 1B is added to an architecture 10A, a user may be required to install a new cable (14F in FIG. 1B) between the POE switch 12 and the new device 32D. As noted, the distance (between a PD 32D and POE switch 12) may be up to 100 meters and installation of a category 5 over that distance in an existing infrastructure may be difficult, expensive, and in some cases impossible.

FIG. 1C is a simplified diagram Power Over Ethernet ("POE") architecture 10C according to various embodiments that does not require the installation of new cable 14F between a new PD 32D and POE switch 12 in order to employ the PD 32D in the architecture. As shown in FIG. 1C, architecture 10C includes a POE multiplexer (POE-MUX) 40 and a POE demultiplexer (POE-DMX) 50 in addition to the new PD 32D and cables 14G and 14H. In an embodiment cables 15A and 15B may be physically attached to the POE-MUX 40. In an embodiment, the algorithm to install a new PD 32D in an architecture 10C includes locating a PD in the existing architecture that is physically close to the where the new PD 32D is to be deployed or allows installation of cabling between the existing PD 32A-C and a POE-DMX 50 and the new PD 32D.

A POE-DMX 50 may then be coupled to the cable 14E previously coupled to the existing, selected PD 32C receiving port (54A of FIG. 2A). A cable 14G may be coupled between the existing, selected PD 32C and a downstream port (54B or 54C of FIG. 2A) of the POE-DMX 50. A cable 14H may be coupled between the new PD 32D and the other downstream port (54B or 54C of FIG. 2A) of the POE-DMX 50. At the POE switch 12, the cable 14E may be disconnected from a port of the POE switch 12 and coupled to POE-MUX 40 downstream port (44A of FIG. 2A). The two (or more) physical cables 15A and 15B (cables 45A and 45B) of POE-MUX 40 may be coupled to ports of the POE switch 12. It is noted that the POE-MUX 40 may include a plurality of physical cables 45A-45B enabling it to be coupled to a plurality of ports of a POE switch 12 and multiplex the ports to its downstream port 44A. Similarly, POE-DMX 50 may have a plurality of downstream ports 54B, 54C enabling it to be coupled to a plurality of PD 34A-D. It is also noted that the ports of the POE-MUX 40 and POE-DMX 50 may be coupled in any order.

Once installed, the POE-MUX 40 may multiplex data signals on its receiving cables (45A-B) (from POE switch 12 ports) and provide the multiplexed data signals to its downstream port 44A. The POE-MUX 40 may also combine energy received on its receiving cables (45A-B) (from POE switch 12 ports) and provide the combined energy to its downstream port 44A. A POE-DMX 50 may receive multiplexed data on its receiving port 54A and transfer it to the appropriate downstream port (54B, 54C)—demultiplex the data. A POE-DMX 50 may also receive energy at its receiving port 54A via a cable 14E and send energy levels to ports 54B, 54C based the load or energy requirements of PD 32A-D coupled to the respective ports 54B, 54C.

FIG. 2A is a simplified diagram of the physical structure of a POE multiplexer 40 according to various embodiments. As shown in FIG. 2A, a POE-MUX 40 may include downstream port 44A in or on its body 42 that is couplable to a standard ethernet cable 14A-E. The port 44A may be a female or male RJ-45 jack in an embodiment, and a female RJ-45 jack in an embodiment. The POE-MUX 40 may also include a plurality of cables 45A-B physically extending from the POE-MUX 40 body 42 for a length with an end 46A-B that is couplable to a standard ethernet port of a POE switch 12. The cable 45A-45B end 46-B may be a male or female RJ-45 jack in an embodiment, and a male RJ-45 jack in an embodiment. The cables 45A-B may have the same or different lengths and may be about 12 inches in length in an embodiment.

FIG. 2B is a simplified diagram of the physical structure of a POE demultiplexer 50 according to various embodiments. As shown in FIG. 2B, a POE-DMX 50 may include receiving port 54A in or on its body 52 that is couplable to a standard ethernet cable 14A-E. The port 54A may be a female or male RJ-45 jack in an embodiment, and a female RJ-45 jack in an embodiment. The POE-DMX 50 may also include a plurality of downstream ports 54B, 54C in or on its body 52 each that are couplable to a standard ethernet cable 14G-H. The plurality of ports 54B, 54C may each have a female or male RJ-45 jack in an embodiment, and a female RJ-45 jack in an embodiment.

Figure 3A:
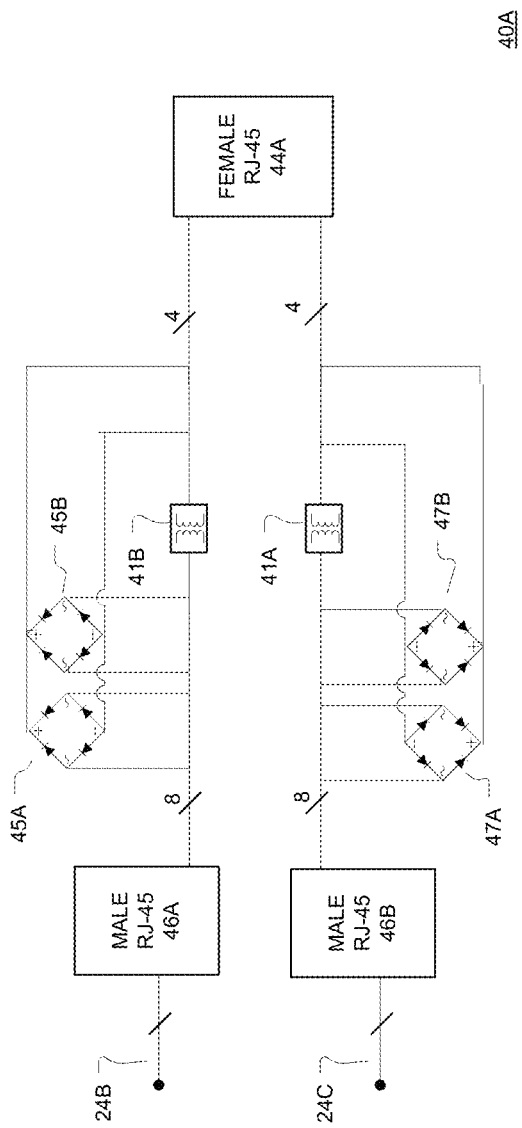
Figure 4A:
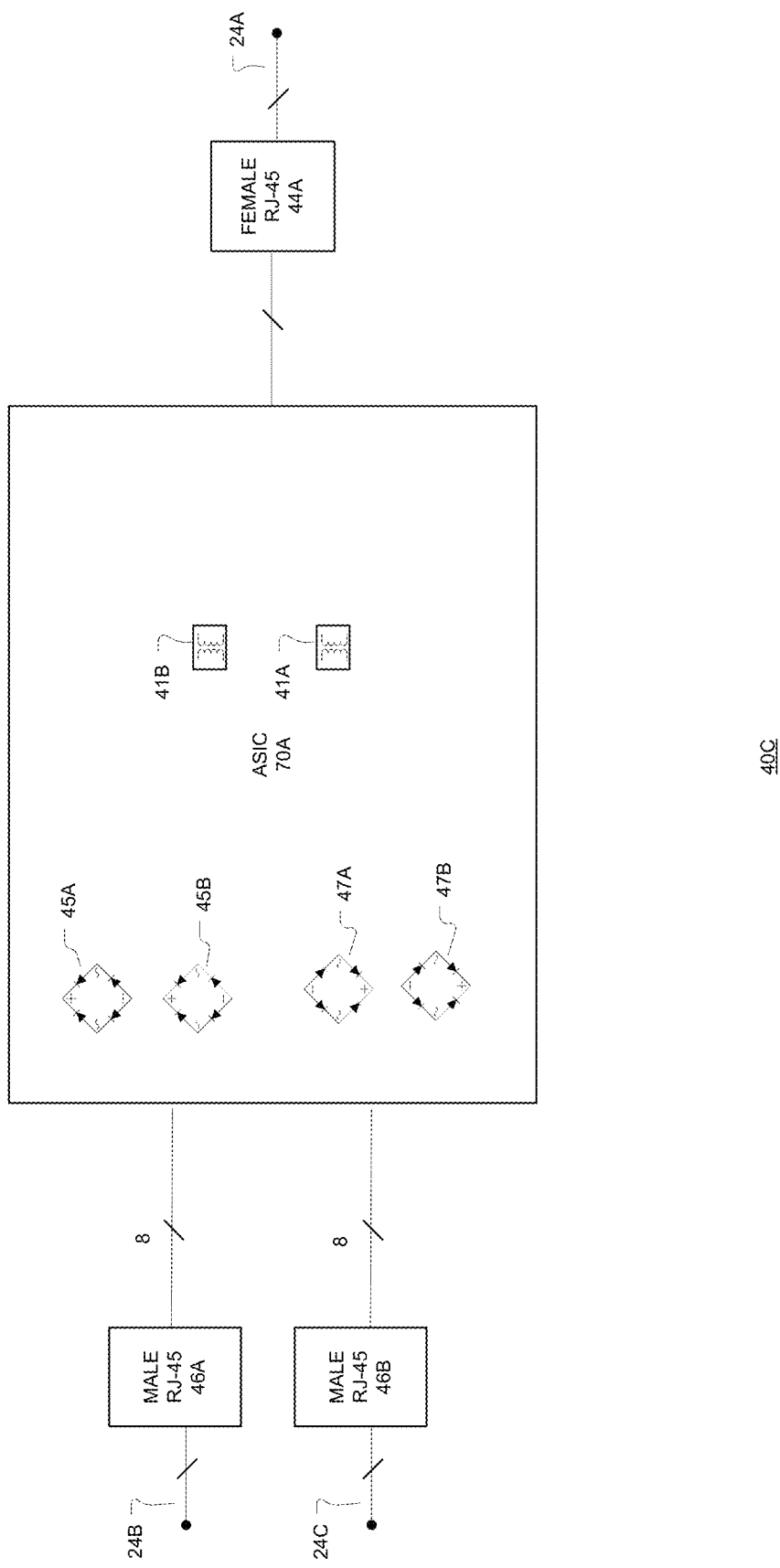
FIGS. 4A and 4B are block diagrams of POE multiplexers including an ASIC according to various embodiments.
Figure 4B:
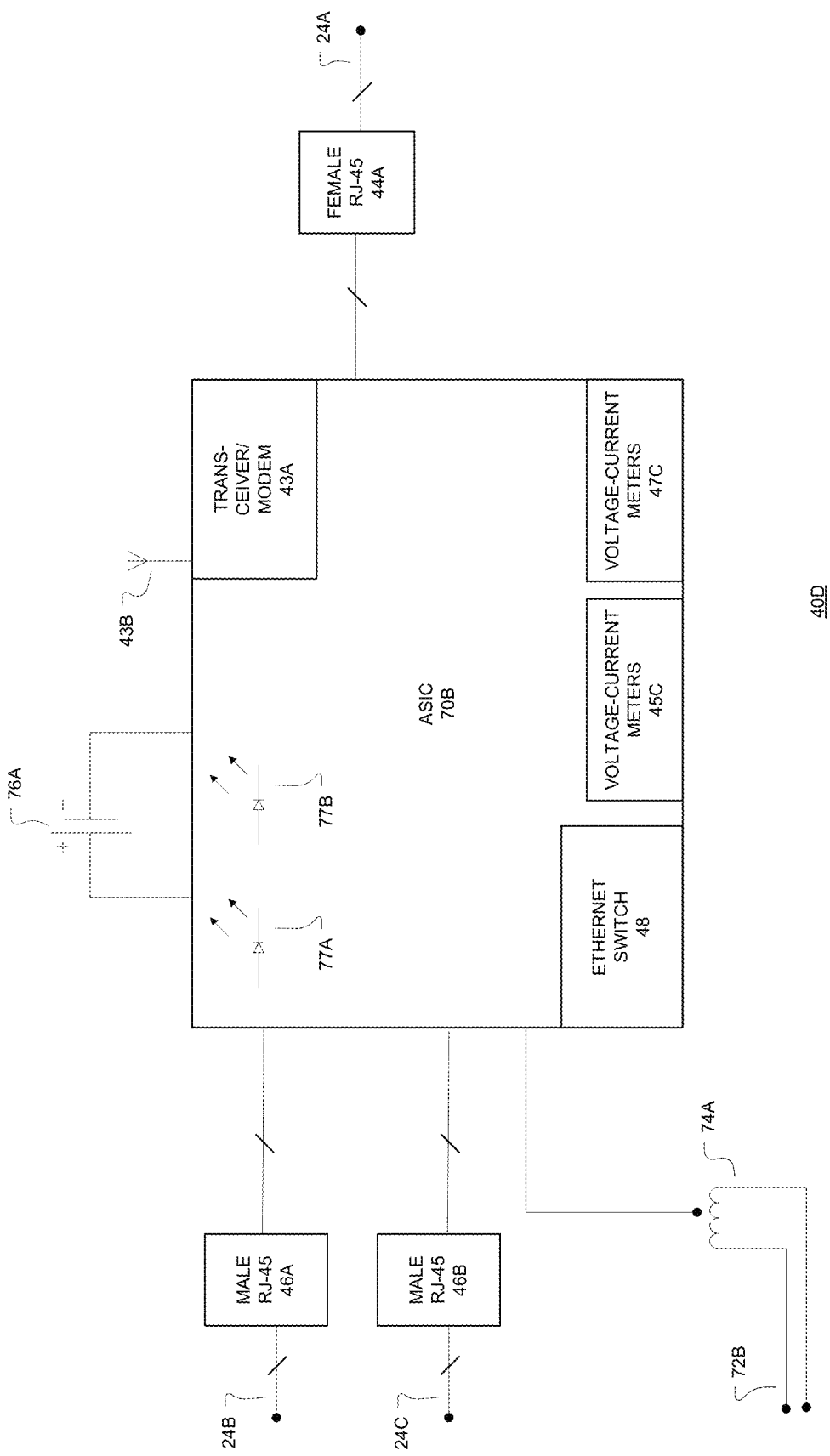
Figure 5A:
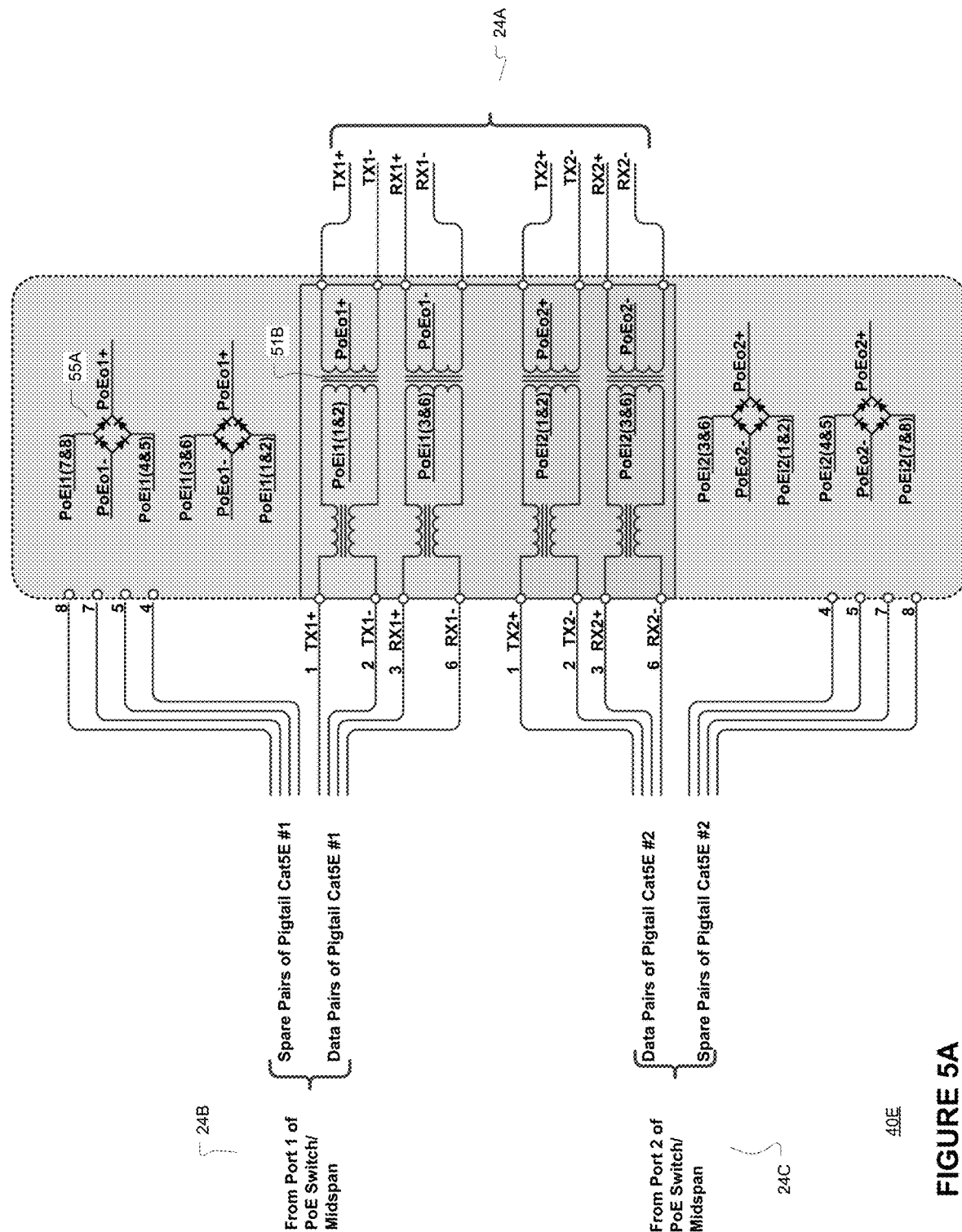
FIG. 5A is a simplified diagram of a POE multiplexer according to various embodiments.
Figure 5B:
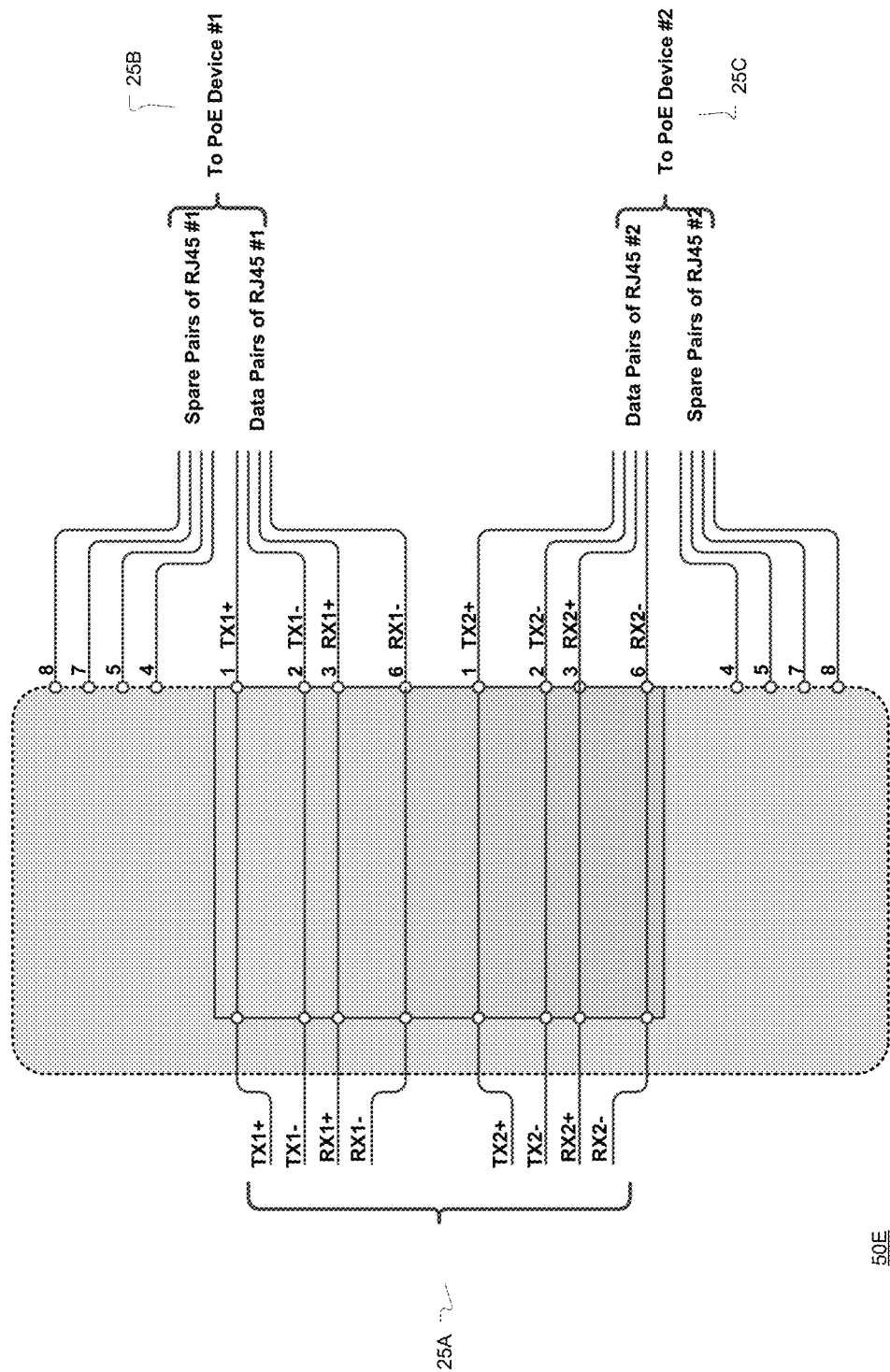
FIG. 5B is a simplified of a POE demultiplexer according to various embodiments.

FIGS. 3A, 3B, 4A, 4B, and 5A are block diagrams of a POE-MUX 40A-E according to various embodiments. As shown in FIGS. 3A, 3B, 4A, 4B, and 5A, the POE-MUX 40A-E may include two upstream RJ45 male connectors 46A, 46B, a downstream RJ45 female connector 44A. As shown in FIGS. 3A and 5A, a POE-MUX 40A, 40E may include diode bridges 45A-B and 47A-B and signal transformers 41A-B. In an embodiment, energy on connector 46A data pairs and spares may be coupled to four lines on the downstream connector 44A via bridges 45A-B. Data on data pairs of upstream connector 46A may be coupled to the 4 lines on the downstream connector 44A via the signal transformer 41B. In an embodiment, energy on up stream connector 46B data pairs and spares may be coupled to four lines on the downstream connector 44A via bridges 47A-B. Data on data pairs of upstream connector 46B may be coupled to the 4 lines on the downstream connector 44A via the signal transformer 41A.

In an embodiment, a POE 40B may include a first POE processing module 45, and a second POE processing module 47, an Ethernet switch 48, several groups of signal transformers 41A-C, a transceiver/modem 43A, and an antenna 43B. Each POE processing module 45, 47 may include one or more diode bridges 45A, 47A, a resistor 45B, 47B, an energy processing—measuring module 45C, 47C, and a display module 45D, 47D. Each upstream RJ45 connector 46A, 46B is configured to be coupled to a source of POE and IP data such as port of a POE switch 12. The downstream RJ45 connector 44A is configured to be coupled to a POE-DMX 50A or similar device in an embodiment. It is noted that the RJ45 jacks 46A, 46B, 44A may be embedded in the POE-MUX 40A physically coupled to the POE-MUX 40A by wire in a pigtail configuration (45A, 45B) (some or all of the jacks 46A, 46B) such as shown in FIG. 2A.

The transformer 74A may be coupled to an external power source 72B wire pair. The transformer 74A may provide power to the Ethernet switch 48 and other elements. In each POE processing module 45, 47, the diode bridge 45A, 47A may be coupled to a data differential pair via a resistor 45B, 47B. A diode bridge 45A, 47A may couple the data differential pair to the energy processing—measuring module 45C, 47C. An energy processing—measuring module 45C, 47C may measure the current and voltage of the differential wire pairs via the resistors 45B, 47B and diode bridge 45A, 47A. An energy processing—measuring module 45C, 47C may determine the energy requirements of a device coupled to a downstream jack 44A and provide energy to the downstream jack 44A via the resistors 45B, 47B and diode bridge 45A, 47A. A display module 45D, 47D coupled to the energy processing—measuring module 45C, 47C may show the determined current level and voltage level, alternately or simultaneously or other indications of status (signal present).

Data received from an upstream port 46A, 46B may be processed by the switch 48 and forwarded to the downstream port 44A via various protocols including internet protocols. As shown in FIG. 3A, a plurality of signal transformers 41A-C may be placed between the switch 48 and signals 24A-C. The signal transformers 41A-C may remove any POE energy and only forward data signals to and from the switch 48. In an embodiment, the signal transformers 41A-C may be embedded in the switch 48. Data received from the downstream port 44A may be also processed by the switch 48 and forwarded to an upstream port 46A, 46B via various protocols including internet protocols as appropriate. In an embodiment, data received on ports 46A, 46B, and 44A may also be communicated to a device 32A, 32B via a wireless signal generated by the transceiver/modem 43A and communicated on the antenna 43B. The modem 43A may modulate the data using a predetermined protocol and communicate the data accordingly. The transceiver/modem 43A may also receive control signals that control the operation of the POE-MUX 40A.

As noted, the ethernet switch 48 may process signals or packets received on either upstream port or jack 46A, 46B and the downstream port or jack 44A. In an embodiment, the ethernet switch 48 may forward the data signal or packet to the other of the upstream port or jack 46A, 46B or the downstream port or jack 44A and provide an acknowledgement signal or packet to the downstream port or jack 44A or the upstream port or jack 46A, 46B. The ethernet switch 48 may modulate received signals or packets on port 46A, 46B, and 44A based on internet protocol or other local protocols of a network 20 including Transmission Control Protocol (TCP) and the Internet Protocol (IP) Link, Internet, or Transport layers according to various protocols including Internet Protocol version 4 and 6.

FIGS. 3C, 3D, 4C, 4D, and 5B are block diagrams of a POE-DMX 50A-E according to various embodiments. according to various embodiments. As shown in FIGS. 3C, 3D, 4C, 4D, and 5B, a POE-DMX 50A-E may include two downstream RJ45 female connectors MB, MC, an upstream RJ45 female connector MA. In an embodiment, a POE-DMX 50B of FIG. 3D first POE processing module 55, and a second POE processing module 57, an Ethernet switch 58, a transformer 74A and power source wire pair 72B, several groups of signal transformers 51A-C, a transceiver/modem 53A, and an antenna 53B. Each POE processing module 55, 57 may include a diode bridge 55A, 57A, a resistor 55B, 57B, an energy processing—measuring module 55C, 57C, and a display module 55D, 57D.

Each downstream RJ45 connector MA, 54B is configured to be coupled to a device that may receive POE and communicate IP data such as PD 34A-D. The upstream RJ45 connector MA is configured to be coupled to a POE-MUX 40A or similar device in an embodiment. It is noted that the RJ45 jacks MA-C may be embedded in the POE-DMX 50A or physically coupled to the POE-DMX 50A by wire in a pigtail configuration.

The transformer 74A may be coupled to an external power source wire pair 72B. The transformer 74A may provide power to the Ethernet switch 58 and other elements via the external power wire pair 72B. In each POE processing module 55, 57, the diode bridge 55A, 57A may be coupled to a data differential pair via a resistor 55B, 57B. A diode bridge 55A, 57A may couple the data differential pair to the energy processing—measuring module 55C, 57C. An energy processing—measuring module 55C, 57C may measure the current and voltage of the differential wire pairs via the resistors 55B, 57B and diode bridges 55A, 57A. An energy processing—measuring module 55C, 57C may determine the energy requirements of a device coupled to a downstream jack 54B, 54C and provide energy to the downstream jack 54B, 54C via the resistors 55B, 57B and diode bridge 55A, 57A. A display module 55D, 57D coupled to the energy processing—measuring module 55C, 57C may show the determined current level and voltage level, alternately or simultaneously or other indications of status (signal present).

Figure 3D:
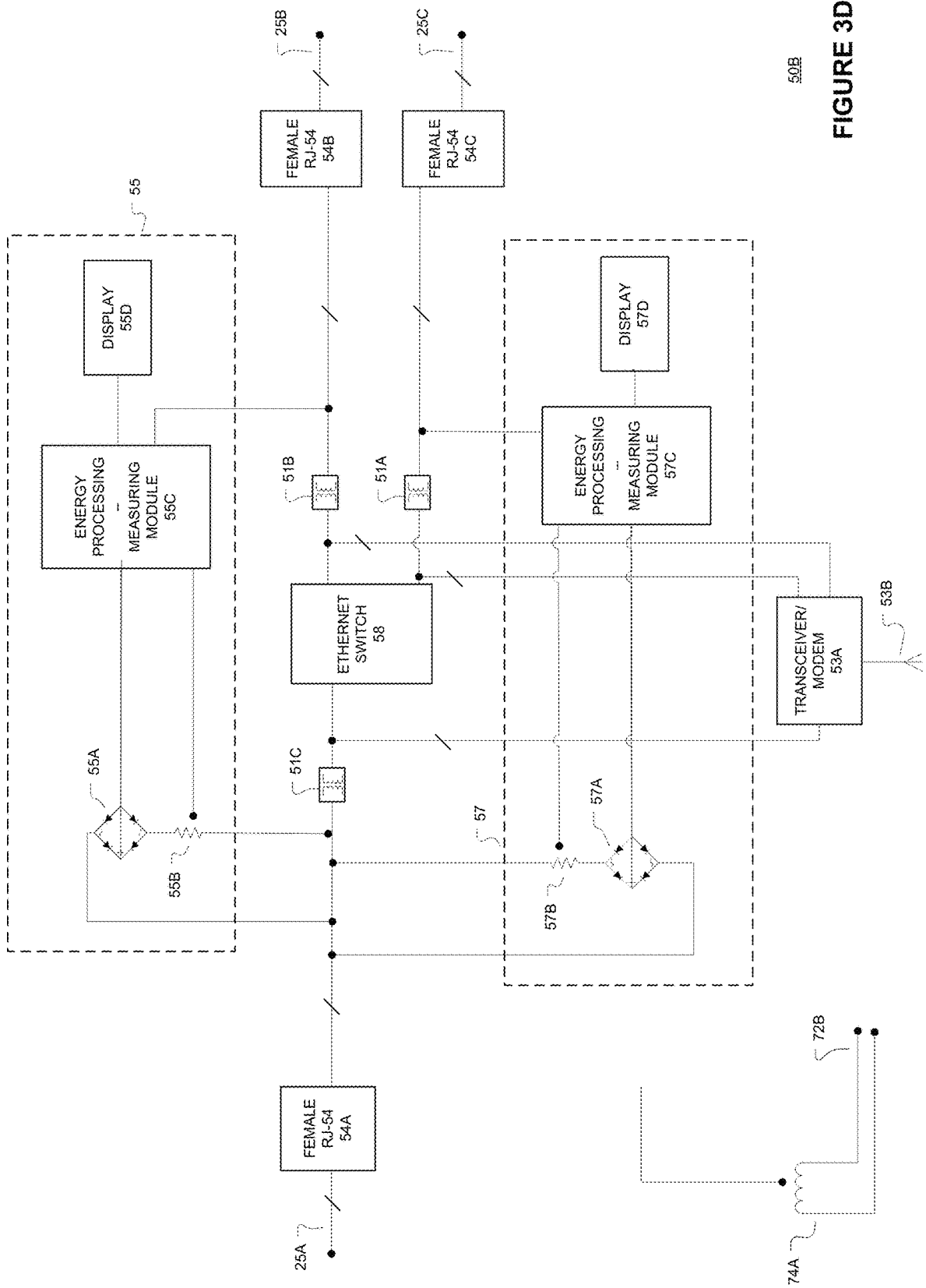

Data received from an upstream port 54A may be processed by the switch 58 and forwarded to a downstream port 54B, 54C via various protocols including internet protocols. As shown in FIG. 3D, a plurality of signal transformers 51A-C may be placed between the switch 58 and signals 25A-C. The signal transformers 51A-C may remove any POE energy and only forward data signals to and from the switch 58. In an embodiment, the signal transformers 51A-C may be embedded in the switch 58. Data received from a downstream port 54B, 54C may be also processed by the switch 58 and forwarded to the upstream port 54A or other downstream port 54B, 54C via various protocols including internet protocols as appropriate. In an embodiment, data received on ports 54A-C may also be communicated to a device 32A, 32B via a wireless signal generated by the transceiver/modem 53A and communicated on the antenna 53B. The modem 53A may modulate the data using a predetermined protocol and communicate the data accordingly. The transceiver/modem 53A may also receive control signals that control the operation of the POE-DMX 50A.

As noted, the ethernet switch 58 may process signals or packets received on either downstream port or jack 54B, 54C and the upstream port or jack 54A. In an embodiment, the ethernet switch 58 may forward the data signal or packet to the other of the downstream port or jack 54B, 54C or the upstream port or jack 54A and provide an acknowledgement signal or packet to the upstream port or jack 54A or the downstream port or jack 54B, 54C. The ethernet switch 58 may modulate received signals or packets on ports 54A-C based on internet protocol or other local protocols of a network 20 including Transmission Control Protocol (TCP) and the Internet Protocol (IP) Link, Internet, or Transport layers according to various protocols including Internet Protocol version 4 and 6.

FIG. 4A is a block diagram of a POE-MUX 40C according to various embodiments. As shown in FIG. 4A, the POE-MUX 40C is similar to POE-MUX 40A where the bridges 45A-B, 47A-B and signal transformers 41A-B are part of a application specific integrated circuit (ASIC) 70A. FIG. 4B is a block diagram of a POE-MUX 40D according to various embodiments. As shown in FIG. 4B, the POE-MUX 40D is similar to POE-MUX 40B shown in FIG. 3B where the bridges 45A, 47A, signal transformers 41A-B, resistors 45B, 47B, transceiver-modem 43A, ethernet switch 48, and energy processing—measuring modules 45C, 47C are embedded in an application specific integrated circuit (ASIC) 70A. The RJ45 jacks 46A, 36B, 44A may be coupled to the ASIC 70A. The interface apparatus 70A may further include a battery 76A to provide operating power when power from wires 72B is not present (backup power) or primary power from POE source in another embodiment. One or more light emitting diodes (LED) 77A, 77B may display the power levels or status of data on ports 46A and 46B.

Figure 4C:
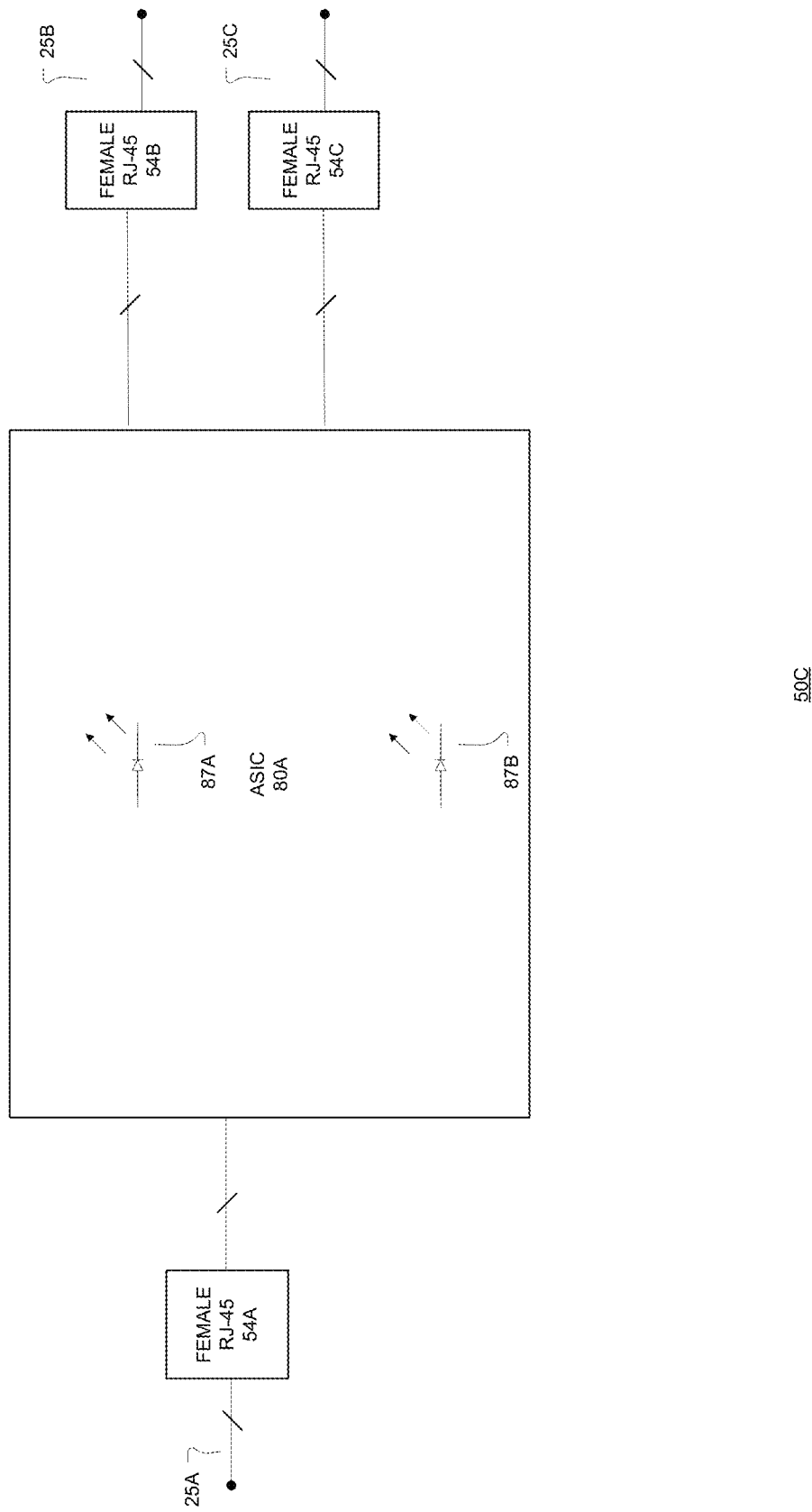
FIGS. 4C and 4D are block diagrams of POE demultiplexers including an ASIC according to various embodiments.
Figure 4D:
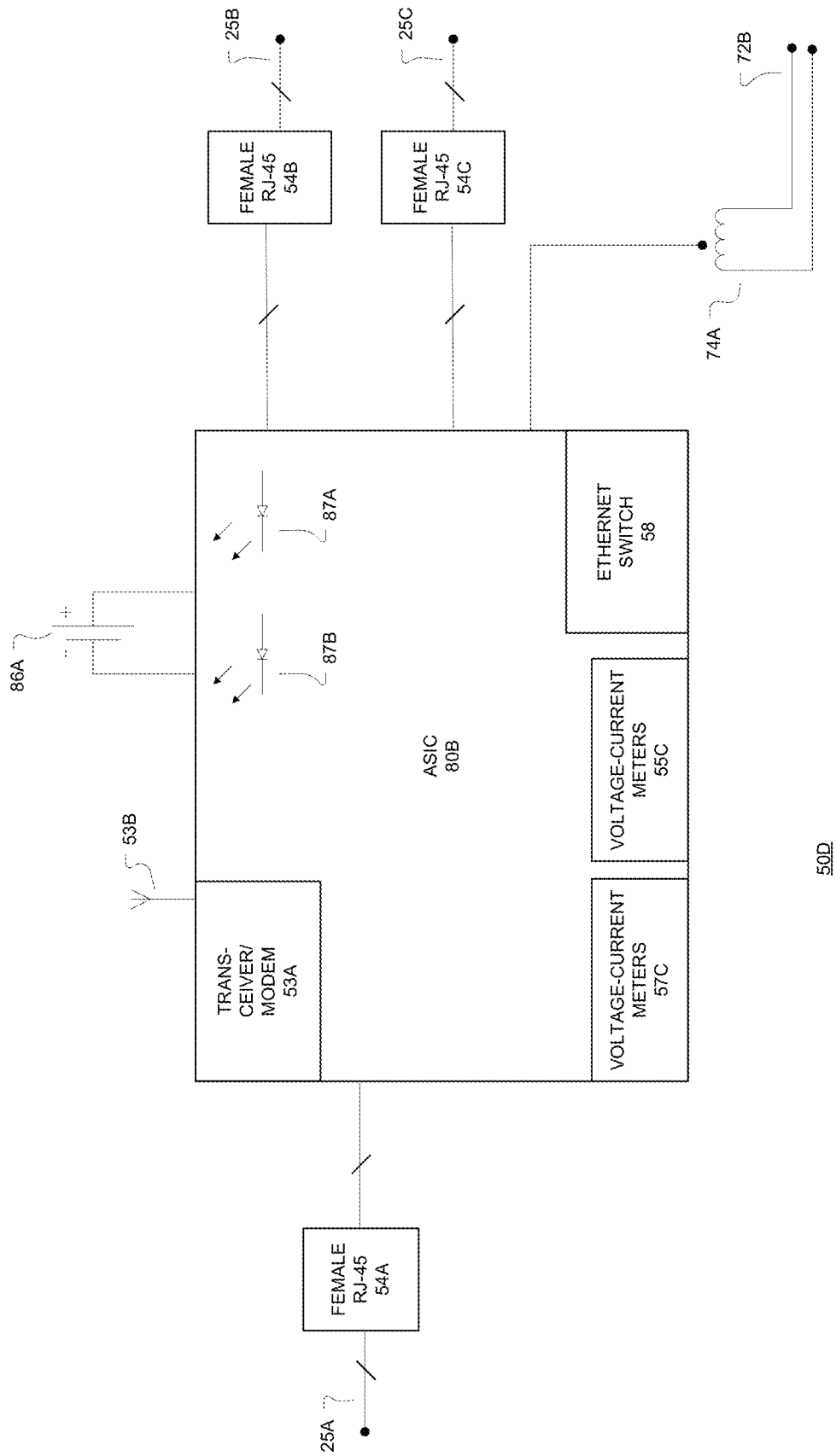

FIG. 4C is a block diagram of a POE-DMX 50C according to various embodiments. As shown in FIG. 4C, the POE-DMX 50C is similar to POE-DMX 50A further including LEDs 87A, 87B in an application specific integrated circuit (ASIC) 80A. One or more light emitting diodes (LED) 87A, 87B may display the power levels or status of data on ports 54A-C. FIG. 4D is a block diagram of a POE-DMX 50D according to various embodiments. As shown in FIG. 4D, the POE-DMX 50D is similar to POE-DMX 50B where the diodes 55A, 57A, resistors 55B, 57B, transceiver-modem 53A, ethernet switch 58, and energy processing—measuring modules 55C, 57C are embedded in an application specific integrated circuit (ASIC) 80B. The RJ45 jacks 54A-C may be coupled to the ASIC 80B. The interface apparatus 80B may further include a battery 86A to provide operating power when power from wires 72B is not present (backup power) or primary power from POE source in another embodiment. One or more light emitting diodes (LED) 87A, 87B may display the power levels or status of data on ports MA-C.

In an embodiment, the transceiver/modem 43A, 53A may employ a code division multiple access (CDMA), time division multiple access (TDMA), Global System for Mobile Communications (GSM), Worldwide Interoperability for Microwave Access (WiMAX) or COMSAT protocol and communicate with the electronic devices 32A-D and 34A-B using a local protocol including WiFi and Bluetooth. As known to one skilled on the art the Bluetooth protocol includes several versions including v1.0, v1.0B, v1.1, v1.2, v2.0+EDR, v2.1+EDR, v3.0+HS, and v4.0. The Bluetooth protocol is an efficient packet-based protocol that may employ frequency-hopping spread spectrum radio communication signals with up to 79 bands, each band 1 MHz in width, the respective 79 bands operating in the frequency range 2402-2480 MHz. Non-EDR (extended data rate) Bluetooth protocols may employ a Gaussian frequency-shift keying (GFSK) modulation. EDR Bluetooth may employ a differential quadrature phase-shift keying (DQPSK) modulation.

The WiFi protocol may conform to a Institute of Electrical and Electronics Engineers (IEEE) 802.11 protocol. The IEEE 802.11 protocols may employ a single-carrier direct-sequence spread spectrum radio technology and a multi-carrier orthogonal frequency-division multiplexing (OFDM) protocol. In an embodiment, one or more electronic devices 32A-D and 34A-B may communicate with a transceiver/modem 43A, 53A via a WiFi protocol.

The cellular formats CDMA, TDMA, GSM, CDPD, and WiMax are well known to one skilled in the art. It is noted that the WiMax protocol may be used for local communication between the one or more electronic devices 30A to 30D may communicate with a transceiver/modem 43A, 53A. The WiMax protocol is part of an evolving family of standards being developed by the Institute of Electrical and Electronic Engineers (IEEE) to define parameters of a point-to-multipoint wireless, packet-switched communications systems. In particular, the 802.16 family of standards (e.g., the IEEE std. 802.16-2004 (published Sep. 18, 2004)) may provide for fixed, portable, and/or mobile broadband wireless access networks. Additional information regarding the IEEE 802.16 standard may be found in IEEE Standard for Local and Metropolitan Area Networks—Part 16: Air Interface for Fixed Broadband Wireless Access Systems (published Oct. 1, 2004). See also IEEE 802.16E-2005, IEEE Standard for Local and Metropolitan Area Networks—Part 16: Air Interface for Fixed and Mobile Broadband Wireless Access Systems—Amendment for Physical and Medium Access Control Layers for Combined Fixed and Mobile Operation in Licensed Bands (published Feb. 28, 2006). Further, the Worldwide Interoperability for Microwave Access (WiMAX) Forum facilitates the deployment of broadband wireless networks based on the IEEE 802.16 standards. For convenience, the terms "802.16" and "WiMAX" may be used interchangeably throughout this disclosure to refer to the IEEE 802.16 suite of air interface standards.

Any of the components previously described can be implemented in a number of ways, including embodiments in software. Any of the components previously described can be implemented in a number of ways, including embodiments in software. The modules may include hardware circuitry, single or multi-processor circuits, memory circuits, software program modules and objects, firmware, and combinations thereof, as desired by the architect of the architecture 10 and as appropriate for particular implementations of various embodiments. The apparatus and systems of various embodiments may be useful in applications. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion. A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A Power over Ethernet (POE) system, including:
a first portable monolithic body including:
a first upstream Ethernet port including first data wire pairs and a first power wire pairs and a second upstream Ethernet port including second data wire pairs and second power wire pairs, the upstream Ethernet ports for receiving PoE power from a physically separate PoE source; and
a downstream Ethernet port including downstream data wire pairs and a downstream power wire pairs, one of the first data wire pairs and second data wire pairs coupled to the downstream data wire pairs and the other of first data wire pairs and second data wire pairs coupled to the downstream power wire pairs; and
a second portable monolithic body, including:
an upstream Ethernet port including upstream data wire pairs and upstream power wire pairs, the upstream Ethernet port for receiving PoE power and data from the first portable monolithic body downstream Ethernet port via a single Ethernet cable; and
a first downstream Ethernet port including first downstream data wire pairs and first downstream power wire pairs for providing data and power to a first PoE device when coupled thereto and a second downstream Ethernet port including second downstream data wire pairs and second downstream power wire pairs for providing data and power to a second PoE device when coupled thereto, one of the first downstream data wire pairs and second downstream data wire pairs coupled to the upstream data wire pairs and the other of first downstream data wire pairs and second downstream data wires pair coupled to the upstream power wire pairs.

2. The PoE system of claim 1, wherein the first portable monolithic body includes only a single downstream Ethernet port.

3. The PoE system of claim 2, wherein the first portable monolithic body includes only a first and a second upstream Ethernet port.

4. The PoE system of claim 1, wherein the second portable monolithic body includes only a single upstream Ethernet port.

5. The PoE system of claim 4, wherein the second portable monolithic body includes only a first and a second downstream Ethernet port.

6. The PoE system of claim 1, wherein the first portable monolithic body includes a plurality of signal transformers to couple the data signals on its first and a second upstream Ethernet ports and to data signals and power signals on to the downstream Ethernet port.

7. The PoE system of claim 6, wherein the first portable monolithic body includes a plurality of bridges to combine energy on its first and a second upstream Ethernet ports power wires pairs and couple the combined energy to the downstream Ethernet port power wire pairs and data wire pairs.

8. The PoE system of claim 6, wherein the first upstream Ethernet port is a male port and is coupled to the first portable monolithic body via a first flexible cable and the second upstream Ethernet port is a male port and is coupled to the first portable monolithic body via a second flexible cable.

9. The PoE system of claim 8, wherein the second portable monolithic body includes a plurality of signal transformers to couple data signals on the upstream Ethernet port power wire pairs and data wire pairs to the first and the second downstream Ethernet ports data wire pairs.

10. The PoE system of claim 9, wherein the second portable monolithic body includes a plurality of bridges to provide energy on the upstream Ethernet port data and power wire pairs to the first and the second downstream Ethernet ports power wires pairs.

11. A Power over Ethernet (POE) method, including:
coupling a first and a second upstream Ethernet port of a first portable monolithic body to a first and a second port of a POE switch, the first upstream Ethernet port each including first data wire pairs and first power wire pairs and a second upstream Ethernet port including second data wire pairs and second power wire pairs via one of the first data wire pairs and second data wire pairs coupled to the downstream data wire pairs and the other of first data wire pairs and second data wire pairs coupled to the downstream power wire pairs; and
coupling a downstream Ethernet port including data wire pairs and power wire pairs of the first portable monolithic body to an upstream Ethernet port of a second portable monolithic body, the downstream Ethernet port including a data wire pair and a power wire pair via a single Ethernet cable; and
coupling a first downstream Ethernet port each including a first downstream data wire pair and a first downstream power wire pair of the second portable monolithic body to provide data and power to a first PoE device when coupled thereto and a second downstream Ethernet port including second downstream data wire pairs and second downstream power wire pairs to provide data and power to a second PoE device when coupled thereto, coupling one of the first downstream data wire pairs and second downstream data wire pairs to the upstream data wire pairs and coupling the other of first downstream data wire pairs and second downstream data wires pair to the upstream power wire pairs.

12. The PoE method of claim 11, wherein the first portable monolithic body includes only a single downstream Ethernet port.

13. The PoE method of claim 12, wherein the first portable monolithic body includes only a first and a second upstream Ethernet port.

14. The PoE method of claim 11, wherein the second portable monolithic body includes only a single upstream Ethernet port.

15. The PoE method of claim 14, wherein the second portable monolithic body includes only a first and a second downstream Ethernet port.

16. The PoE method of claim 11, including employing a plurality of signal transformers to couple the data signals on the first portable monolithic body's first and a second upstream Ethernet ports to data signals and power signals on the first portable monolithic body's downstream Ethernet port.

17. The PoE method of claim 16, including employing a plurality of bridges to combine energy on the first portable monolithic body's first and a second upstream Ethernet ports power wires pairs and couple the combined energy to the first portable monolithic body's downstream Ethernet port power wire pairs and data wire pairs.

18. The PoE method of claim 16, wherein the first upstream Ethernet port is a male port and is coupled to the first portable monolithic body via a first flexible cable and the second upstream Ethernet port is a male port and is coupled to the first portable monolithic body via a second flexible cable.

19. The PoE method of claim 18, including employing a plurality of signal transformers to couple data signals on the second portable monolithic body's upstream Ethernet port power wire pairs and data wire pairs to the second portable monolithic body's first and second downstream Ethernet ports data wire pairs.

20. The PoE method of claim 19, including providing a plurality of bridges to provide energy on the second portable monolithic body's upstream Ethernet port data and power wire pairs to the second portable monolithic body's first and second downstream Ethernet ports power wires pairs.

* * * * *